Figure 1:
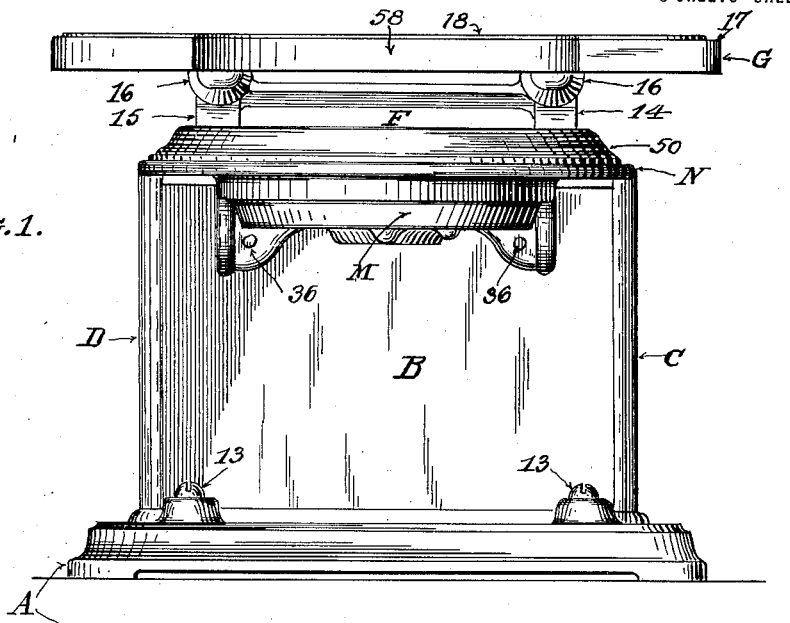

M. J. WEBER.
WEIGHING SCALE.
APPLICATION FILED DEC. 20, 1919.

1,382,699.

Patented June 28, 1921.
3 SHEETS—SHEET 1.

WITNESS:
A. Stark.

INVENTOR:
MATHIAS J. WEBER,
Michael J. Stark Sons
ATTORNEYS.

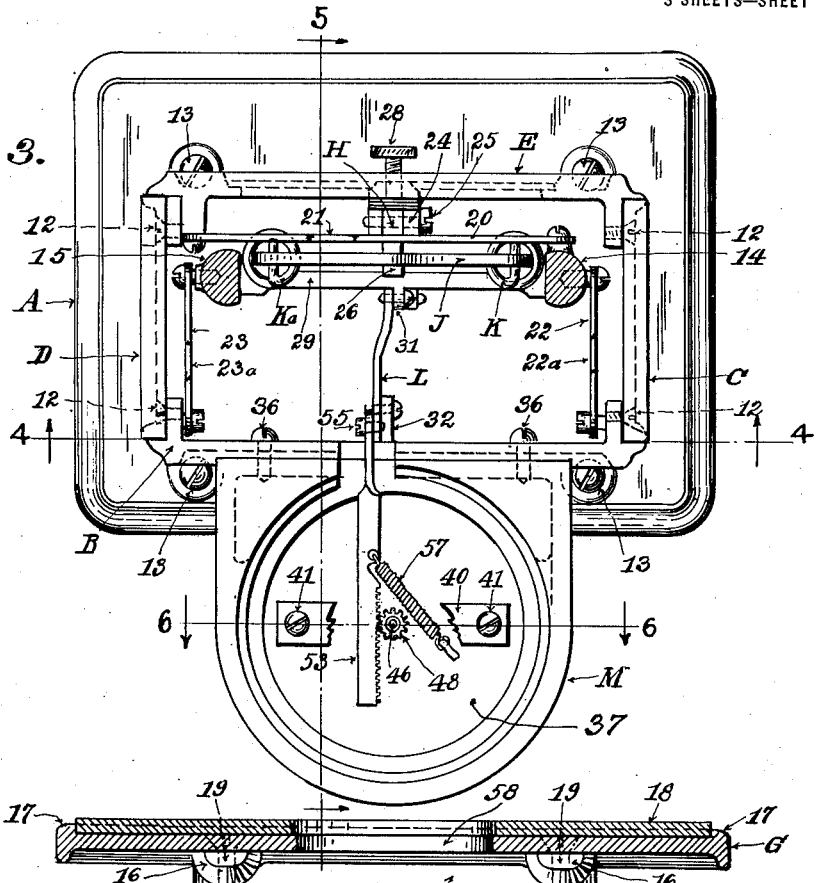

M. J. WEBER.
WEIGHING SCALE.
APPLICATION FILED DEC. 20, 1919.
1,382,699.
Patented June 28, 1921.
3 SHEETS—SHEET 3.
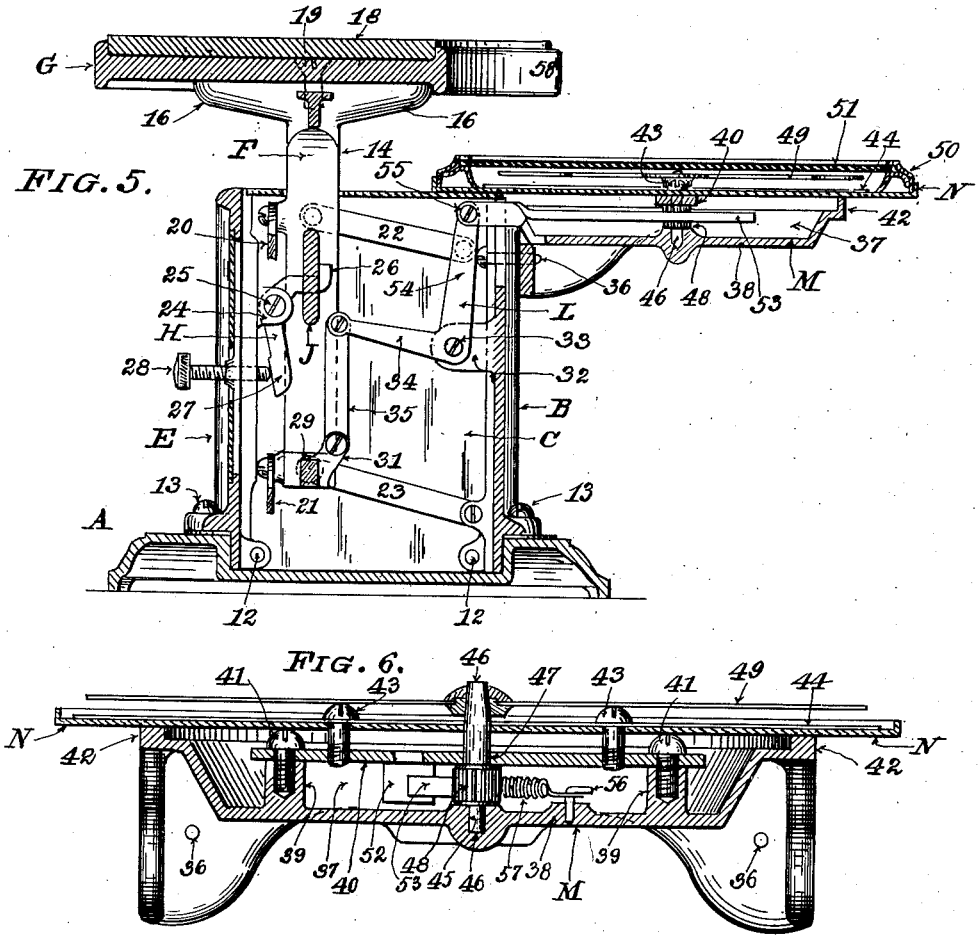
WITNESS:
Al. Stark.
INVENTOR:
MATHIAS J. WEBER:
BY Michael J. Stark & Sons
ATTORNEYS.

UNITED STATES PATENT OFFICE.

MATHIAS J. WEBER, OF CHICAGO, ILLINOIS, ASSIGNOR TO CONTINENTAL SCALE WORKS, OF CHICAGO, ILLINOIS, A CORPORATION OF ILLINOIS.

WEIGHING-SCALE.

1,382,699.  Specification of Letters Patent.  Patented June 28, 1921.

Application filed December 20, 1919. Serial No. 346,291.

*To all whom it may concern:*

Be it known that I, MATHIAS J. WEBER, a citizen of the United States, and resident of the city of Chicago, in the county of Cook and State of Illinois, have invented certain new and useful Improvements in Weighing-Scales; and I do hereby declare that the following description of my said invention, taken in connection with the accompanying sheets of drawings, form a full, clear, and exact specification which will enable others skilled in the art to which the said invention appertains to make and use the same.

This invention has general reference to weighing scales, and especially that type of scales which are placed upon a floor, and having a low platform upon which a person desirous of taking his or her weight steps and then looks downwardly upon a dial in which a graduated index is secured to which a rotating hand points to indicate the weight of the person. Such scales are now coming into very extensive use in bath rooms, public and private baths, etc., and supply a long-felt want for an inexpensive, yet very accurate scales of light weight so that it can be readily carried about from room to room.

In order to accomplish this desirable object, I construct these scales, in the preferred embodiment of my invention, as shown in the drawings forming a part of this specification, in which—

Figure 2:
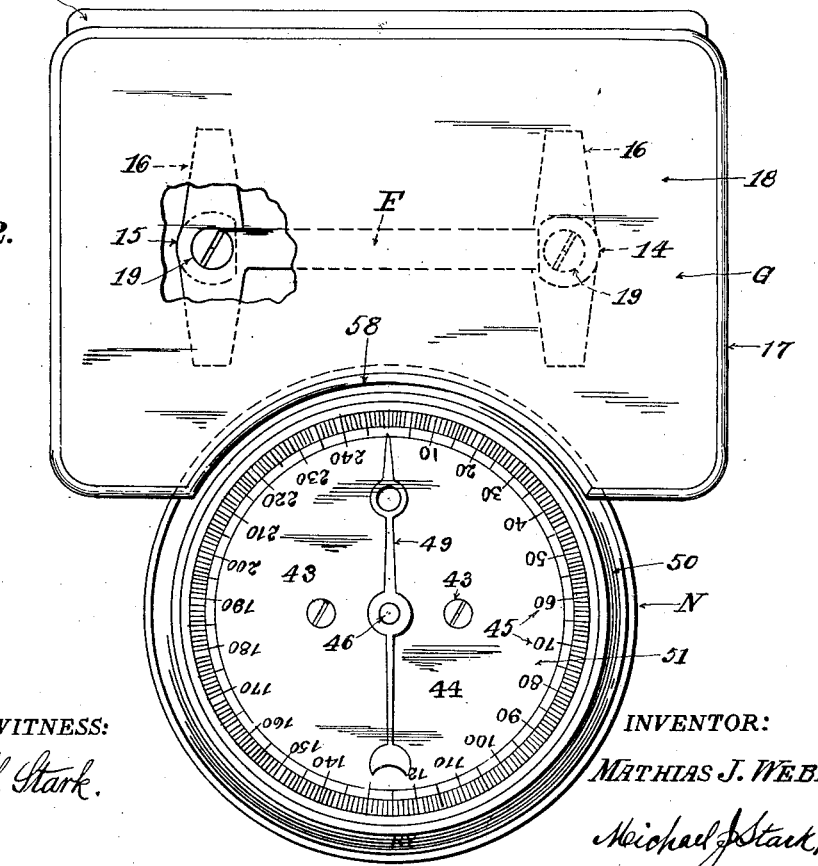

Figure 1 is a front elevation of this improved scale. Fig. 2 is a plan of the same. Fig. 3 is a sectional plan below the line 3—3 of Fig. 4. Fig. 4 is a sectional elevation on line 4—4 of Fig. 3. Fig. 5 is a transverse sectional elevation on line 5—5 of Figs. 3 and 4, the tensioned springs shown in other figures being omitted. Fig. 6 is a sectional view on line 6—6 of Fig. 3.

Like parts are designated by the same characters and symbols of reference in all the various figures.

A, in the drawings designates the base of these scales. B, is the front wall; C, D, are the side walls, and E, the rear wall of the casing containing the weighing mechanism of the scales.

These walls are secured together by screws 12, Figs. 3 and 4, and to the base A by screws 13, whereby the parts are held together so that the scale can be readily carried about. Within this casing is mounted the weighing mechanism consisting of a substantially rectangular, open frame F, the side members 14, 15, of which have at their upper ends extensions 16, to support a platform G, said platform being a metallic plate having an upwardly extending rim 17, between which is mounted a covering 18, preferably of sheet cork, felt, or the like, cemented to the platform, if desired. This platform is secured to a rectangular, open frame F, by screws 19, as indicated in Fig. 1 and others, this frame being guided in its vertical movement by two longitudinal links 20, 21, and two pairs of transverse links 22, 22ª, 23, 23ª, one of the ends of which are pivoted to the rectangular frame, the other ends of which are pivotally connected to the casing, as illustrated in Fig. 3 and others.

At the rear wall of the casing, E, there is provided a forked bearing 24, in which there is pivoted, upon a bolt 25, a bell-crank lever H, one arm of which is upwardly cranked, as at 26, the other, lower arm 27, bearing upon an adjusting screw 27, passing through the rear wall E, the object of which will be hereinafter explained. Upon this cranked portion 26 of the bell-crank lever H, is placed a bar or beam J, said beam having medially an opening 28, through which the cranked portion 26 is passed.

The lower ends of the side members 14, 15, of the frame F are connected by a bar 29, and to this bar, and the terminals of the beam J, there are hitched a pair, of coil springs K, Kª, the lower ends of which are connected to screw-adjusting devices 30, of any desired construction, wherewith to tension the springs K, Kª.

At the lower bar 29 of the rectangular frame F, there is, medially of its length, a lug 31, and at the back of the front wall B, and above the lug 31, there is formed a lug 32, in which there is pivotally mounted, by a pivot bolt 33, a bell-crank lever L, the arm 34 of which is connected to the lug 31, by a link 35, whereby vertical movement of the frame F is communicated to the bell-crank lever L.

To the front or face of the front wall B, there is secured, preferably by screws 36, a housing M, said housing including a plate, said plate being dished, as at 37, Figs. 5 and 6, from the bottom 38 of which project upwardly two posts 39, on which there is supported a cross-bar 40, secured to the posts by screws 41. To this cross-bar, and bearing upon the rim 42, of the dished member M, there is a circular plate N, which plate is secured to the cross-bar 40, by screws 43. To this plate N, there is cemented a circular dial 44, the periphery of which is printed with an index 45, Fig. 2, registering pounds, preferably from 0 to 250.

Centrally in the bottom 38 of the dished element M, there is a step bearing 45, in which there is rotatably mounted a shaft 46, there being in the cross-bar 40, a bearing 47, through which the shaft 46 passes and by which it receives its second support. Upon this shaft, and below the cross-bar 40, there is a gear-pinion 48, preferably formed integrally with shaft 46; and at the upper end of this shaft there is mounted an index pointer or hand 49. Over this plate N there is placed a rim 50, which holds in position a transparent disk 51, to protect the mechanism within the housing from dust, moisture, etc., in an obvious manner.

Below the cross-bar 40 there is provided a slotted guide 52, Fig. 6, in which there is slidably mounted a rack-bar 53, which meshes with the gear pinion 48, one end of said rack-bar being pivotally connected to the arm 54 of the bell-crank lever L, by a pivot bolt 55. From the bottom 38 of the housing M extends a hook 56, to which one end of a coil spring 57 is secured, the other end of said coil spring 57 being hitched to the rack-bar 53, to pull this rack-bar toward the gear pinion 48, and thereby hold the gear teeth of these two elements in intimate contact, to prevent any play or back-lash thereof. This spring 57, being located angularly with reference to the linear movement of the rack-bar 53, serves the further function of taking up any slack in the connections between the vertically movable platform frame and the rack-bar, so that there is a positive forward and backward movement of the index hand, which is essential when a load is placed upon the platform and then partly removed after its weight has been ascertained and the index hand is moving backward, in which any play of back-lash in the moving parts would affect the correct indication of the index hand.

It will now be noted that the dial housing with its dial and the index hand, are horizontally disposed, so that a person standing on the scale platform may readily read the number to which the index hand points; and to fully expose the index chart to view without having the housing extend too far from the front wall of the casing, I cut away a portion of the platform G, as indicated at 58, in Figs. 1, 2, 4, and 5.

I have hereinbefore mentioned the adjusting screw 28 which acts upon one arm of the bell-crank lever H. Upon the cranked portion 26 of this bell-crank lever the entire scale mechanism is supported so that rotating this adjusting screw in one direction, will cause the platform and its supporting frame to rise, while rotating it in the opposite direction these elements will be lowered; and since this vertical movement is communicated to the index hand, it follows that if for any reason the index hand does not point to zero when there is no load on the platform, this can be instantly corrected by rotating this screw 28 in the proper direction, it being, of course, assumed that the spiral springs K, K$^a$, have been so selected, and the leverage of the two arms of the bell-crank so calculated that the movement of the rack-bar and the corresponding movement of the index hand agree with the scale on the dial when weight is placed on the platform G. And in order that the tension of the springs K, K$^a$, may be regulated to sustain the load and move downwardly the proper distance to correctly record the weight of the load, the tension of these springs, which are normally under but slight tension, can be increased or reduced by a proper manipulation of the screw-operated tensioning means 30, located in the lower bar 24 of the frame F, as illustrated in Fig. 4. These tensioning means are, however, not readily accessible. A screw driver to actuate these means is necessary to reach the two screws 58; and to enable this being accomplished, there are in the bottom 61, of the base A, two openings 59. But since it is possible to tamper with the scales to make them record either "light" or "heavy," by changing the adjusting devices 30, these openings are closed after the scales have been tested, by an inspector of weights and measures, by pasting over these openings 59 seals 60, or by plumbing these holes, so that access to the adjusting device cannot be had without breaking, or mutilating these seals, which would show immediately that the scale has been meddled with, and thereby render the offender liable to punishment or fine or both. By the introduction of these sealing means, these scales have been approved by the inspection departments of nearly every State of the United States and also received permission for importation in foreign countries where laws require the inspection, testing, and sealing of scales so that they cannot be manipulated for fraudulent purposes.

Attention is now invited to the bellcrank lever L. This lever has arms of unequal length, which are approximately at right angles, but somewhat less than 90 degrees, the arm 34 being, in normal position above a horizontal line through the pivotal point of the lever L, while the vertically disposed arm 54 is to the right of a vertical line drawn through said pivotal point. The downward movement of the platform and its accessories is not a uniform one under a geometrically increasing load, but decreases slightly as the load is increased. It follows that the movement of the hand over the dial decreases slightly and thereby registers weight incorrectly or "light," unless the scale on the dial is corrected accordingly. To compensate for this gradually decreasing movement of the platform, the arms of the bellcrank lever are normally positioned as hereinbefore described so that as the arm 34 moves downwardly it becomes, as it were, longer as it approaches the horizontal position, while the arm 54 which is connected to the rack bar also becomes longer as its approaches the vertical position, but this movement of the arm at its point of connection with the rack bar differs slightly, i. e., it is greater than that of the horizontal arm, in addition to being longer, thereby causing a differential movement which compensates for the slightly decreasing movement of the scale platform. Without this differential movement it would be necessary to adapt the graduations on the dial to the movement of the platform, which is objectionable and might lead to errors, an objection which I have overcome by the peculiar positioning of the two arms of the bellcrank lever with reference to each other, and the angularity thereof.

I have hereinbefore described with considerable minuteness the preferred embodiment of my invention, but I desire it to be understood that I am aware that details hereinbefore set forth may be changed, and parts omitted, without departing from the scope of my invention as defined in the appended claims.

Having thus fully described this invention, I claim as new, and desire to secure to myself by Letters Patent of the United States—

1. In weighing scales of the type set forth, the combination, of a casing, a platform above said casing, spring-actuated means for supporting said platform and permitting vertical movement thereof, a housing extending horizontally from the front of said casing, a vertically disposed pinion shaft rotatably mounted in said housing, a graduated dial plate mounted on said housing, an index hand mounted on said pinion shaft, mechanism for transmitting vertical movement of said platform to said index hand, means for adjusting the tension of the spring-actuated mechanism, means for preventing access to said adjusting mechanism, and means for raising and lowering said platform and associated mechanism for changing the position of the index hand with reference to the graduations on the dial plate.

2. In weighing scales of the type set forth, the combination, of a casing, a platform above said casing, spring-actuated mechanism for supporting said platform and permitting vertical movement thereof, brackets extending from the front of said casing, a dished plate supported by said brackets in horizontal position, a dial plate mounted on said dished plate, studs extending from the bottom of said dished plate, a cross-bar secured to said studs, a pinion shaft journaled in the bottom of said dished plate and in said cross-bar, a pinion on said shaft between said bottom and said cross-bar, said shaft projecting beyond said dial plate, an index hand at the upper end of said shaft, a rack-bar slidably mounted in said dished plate in horizontal position and engaging said pinion, a spiral spring in said dished plate, said spiral spring being obliquely disposed in said dished plate and extending to said rack-bar, and mechanism operatively connecting said spring-actuated mechanism to said rack-bar to translate the vertical movement of said spring-actuated mechanism into rotative movement of said index hand.

3. In weighing scales of the type set forth, the combination, of a casing, weighing mechanism in said casing, a housing for containing the indicating means of the scales, said housing being a dished plate, said dished plate being secured to said casing in horizontal position, posts extending upwardly from the bottom of said dished plate, a cross-bar mounted on said posts, a shaft vertically mounted in said dished plate, said shaft having journal bearings in said bottom and in said cross-bar, a pinion on said shaft, a rack-bar horizontally slidable in said dished plate and engaging said pinion, a spring in said dished plate, said spring being obliquely mounted to the linear movement of said rack-bar and connected to said rack-bar, and means for imparting reciprocative movement to said rack-bar when said weighing mechanism is operating.

4. In weighing scales of the type specified, the combination, of a casing, weighing mechanism in said casing, a housing for containing the indicating means of the scales, said housing being a dished plate, said dished plate being secured to said casing in horizontal position, posts extending upwardly from the bottom of said dished plate, a cross-bar mounted on said posts, a shaft vertically mounted in said dished plate, said shaft having journal bearings in said bottom and in said cross-bar, a pinion on said shaft, a rack-bar horizontally slidable in said dished plate and engaging said pinion, a spring in said dished plate, said spring being obliquely mounted to the linear movement of said rack-bar, and connected to said rack-bar, and means for imparting reciprocative movement to said rack-bar, said means including a bell-crank lever, one arm of said bell-crank being pivotally connected to said rack-bar, the other arm of said bell-crank lever being link-connected to the weighing mechanism.

5. In weighing scales of the type specified, the combination, of a casing, weighing mechanism in said casing, said weighing mechanism including an open rectangular frame, said frame having a bottom bar, a beam mounted in said open frame and supported by said casing, coil springs mounted in said open frame and connecting said beam to said bottom bar, a lug extending from said bottom bar, a second lug extending inwardly from said casing, a bell-crank lever pivotally mounted in said second lug, one arm of said bell-crank lever being link-connected to said first-mentioned lug, a housing extending horizontally from said casing, a rack-bar horizontally slidable in said housing, said rack-bar being pivotally connected to the second arm of said bell-crank lever, a dial plate fixedly mounted on said housing, an index hand rotatable on said dial plate, and means connecting said rack-bar to said index hand.

6. In weighing scales of the type specified, the combination, of a platform, weighing mechanism supporting said platform, a dial, an index hand rotatably mounted above said dial, and means connected to said index hand and said weighing mechanism, said means including a pivoted bellcrank lever, said bellcrank lever having arms, said arms being approximately at right angles to each other but including less than 90 degrees between them, said arms in normal position being in the rear of a horizontal, respectively vertical line through the pivotal point of said lever, said arms advancing toward these lines as the platform is moved downwardly by a superposed load on said platform to afford a differential movement between said platform and said index hand which compensates for the unequal movement of said platform.

In testimony that I claim the foregoing as my invention, I have hereunto set my hand.

MATHIAS J. WEBER.